F. W. DROSTEN.
PAPER CUTTER.
No. 11,042. Reissued Nov. 19, 1889.
Fig. I.
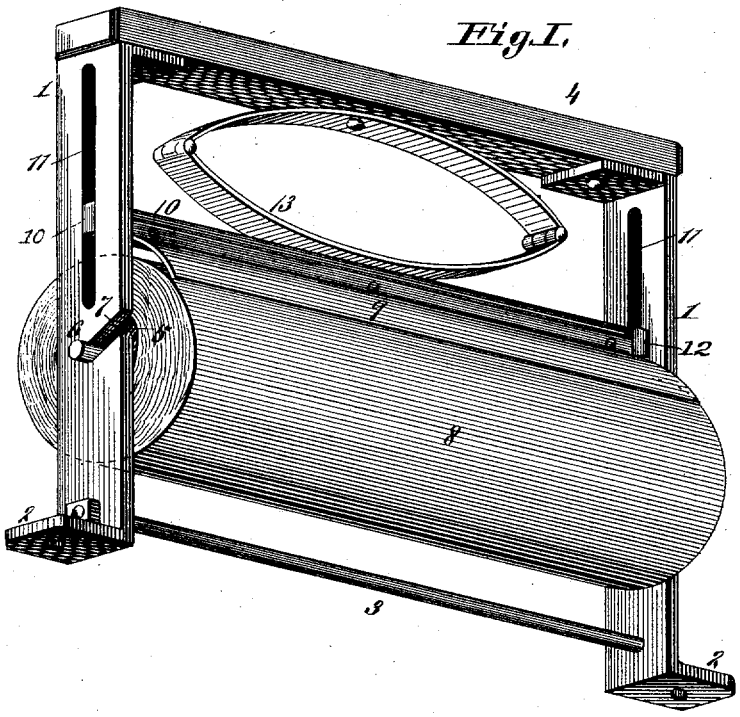
Fig. II.
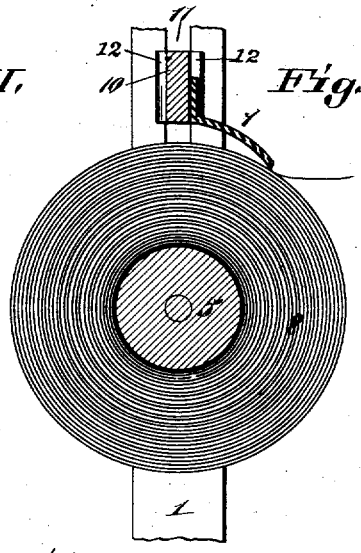
Fig. III.
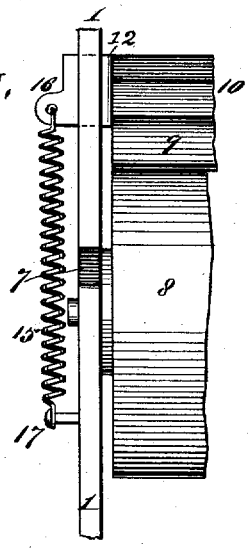
Attest:
Charles Pickles,
E. Arthur,
Inventor:
Frederick W. Drosten
By Knight Bros
Atty.
N. PETERS. Photo-Lithographer, Washington, D. C.

UNITED STATES PATENT OFFICE.

FREDERICK W. DROSTEN, OF ST. LOUIS, MISSOURI.

PAPER-CUTTER.

SPECIFICATION forming part of Reissued Letters Patent No. 11,042, dated November 19, 1889.

Original No. 365,334, dated June 21, 1887. Application for reissue filed May 20, 1889. Serial No. 311,477.

*To all whom it may concern:*

Be it known that I, FREDERICK W. DROSTEN, of the city of St. Louis, in the State of Missouri, have invented a certain new and useful Improvement in Paper-Cutters, of which the following is a full, clear, and exact description, reference being had to the accompanying drawings, forming part of this specification, and in which—

Figure I represents a perspective view of my improved paper-cutter. Fig. II is a transverse section through the roll and knife, showing part of the frame in elevation. Fig. III is a detail side elevation illustrating a modification of the form shown in Fig. I.

My invention relates to an improved paper-cutter for store use and the like; and my invention consists in features of novelty hereinafter fully described, and pointed out in the claims.

Referring to the drawings, 1 represents the frame, provided with feet 2, by which it may be secured to any suitable support, and which is tied together by a rod 3 at bottom and a strip 4 at top.

5 represents a roller provided with gudgeons 6, fitting in slots or notches 7 of the frame, and upon this roller is wound the paper 8, which is removed as required for use.

9 represents a knife secured to a sliding head or plate 10, held and working in slots 11 of the frame 1 and provided with projections 12, by which it is kept from end movement in the frame. The knife projects downwardly and forwardly from the head 10, as shown in Figs. I and II.

13 represents a spring (a leaf-spring being preferred) located between the head 10 and the strip 4 of the frame, and which serves to hold the knife down upon the roll, and which also serves to feed the knife down automatically as the roll is reduced in size. When a piece of paper is wanted, the end is pulled out, as shown in Fig. II, and then cut off by drawing it against the edge of the knife.

As a modification of the spring shown in Fig. I, coil-springs 15 may be used, as shown in Fig. III, the springs being connected to lugs or extensions 16 of the head 10 and to pins 17 on the frame. These springs, it will be seen, will hold the knife down upon the roll of paper.

When it is desired to remove the roller to substitute it by another, the cross-head and knife are raised until the roller can be removed from the inclined slots 11, as will be plainly understood.

I claim as my invention—

1. In a paper-cutter, the combination, with a roller and with the frame having slots and having notches in which said roller is removably journaled, of a cross-head whose ends engage in said slots, and which cross-head is guided thereby, and a knife secured to said cross-head and caused to maintain a constant pressure upon the roller as its size decreases by means of a spring, substantially as set forth.

2. In a paper-cutter, the combination of the frame having slots 11 and notches, roller having gudgeons fitting in the notches in the frame, cross-head having lugs 12 and fitting in the slots of the frame, knife projecting forwardly and downwardly and secured to the cross-head, and spring located between the cross-head and the top of the frame, substantially as set forth.

FREDERICK W. DROSTEN.

In presence of—
GEO. H. KNIGHT,
EDW. S. KNIGHT.